UNITED STATES PATENT OFFICE.

SALLY MARIA McNETT, OF TOPEKA, KANSAS, ASSIGNOR OF ONE-HALF OF HER RIGHT TO THOMAS F. PARRISH, OF WASHINGTON, DISTRICT OF COLUMBIA, AND J. A. JOHNSTON, OF TOPEKA, KANSAS.

IMPROVEMENT IN HAIR-RESTORATIVES.

Specification forming part of Letters Patent No. 125,066, dated March 26, 1872.

SPECIFICATION.

I, S. M. McNETT, of the city of Topeka, county of Shawnee, State of Kansas, have invented a certain Compound called Mrs. McNett's Cresco for promoting the growth of the human hair, preventing disease of the scalp, and removing the dandruff, and keeping the scalp clean.

The nature of said invention consists in the combination and unity of the following parts in substantially the proportions as follows: Alcohol, one pint; castor-oil, one gill; bay rum, one-half ounce; tincture lobelia, one-half dram; ammonia, one-fourth ounce; cantharides, one-fourth ounce.

After the above parts have been thoroughly mixed, one table-spoonful of salt is dissolved in three ounces of soft water and added thereto. Perfume as may be desirable.

Having thus described my compound, what I claim, and desire to secure by Letters Patent, is—

The manufacture or preparation of a compound, which is denominated Mrs. McNett's Cresco, of the ingredients, and in the proportions, and for the purpose set forth.

SALLY MARIA McNETT.

Witnesses:
P. I. BONEBRAKE,
L. F. McNETT.